(12) United States Patent (10) Patent No.: US 8,636,568 B1
Farley (45) Date of Patent: Jan. 28, 2014

(54) COMBINE STEPPED THRESHING CHAMBER

(75) Inventor: Herb M. Farley, Elizabethtown, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/546,627

(22) Filed: Jul. 11, 2012

(51) Int. Cl.
*A01F 12/00* (2006.01)

(52) U.S. Cl.
USPC .......................................................... 460/68

(58) Field of Classification Search
USPC ............. 460/68, 16, 66, 69, 80, 109, 112, 67; 209/687; 56/14.6
See application file for complete search history.

(56) References Cited

U.S. PATENT DOCUMENTS

| | | | |
|---|---|---|---|
| 509,490 A | 11/1893 | Richter | |
| 1,744,335 A | 1/1930 | Schlayer | |
| 1,776,396 A | 9/1930 | Schlayer | |
| 2,036,239 A | 4/1936 | Suwalkowski | |
| 2,490,564 A | 12/1949 | Vincent | |
| 3,145,715 A | 8/1964 | Horn | |
| 3,589,111 A | 6/1971 | Gullickson et al. | |
| 3,871,384 A * | 3/1975 | Depauw et al. | 460/109 |
| 4,078,571 A | 3/1978 | Todd et al. | |
| 4,249,543 A | 2/1981 | Rowland-Hill | |
| 4,258,726 A * | 3/1981 | Glaser et al. | 460/109 |
| 4,305,407 A * | 12/1981 | De Coene | 460/107 |
| 4,330,000 A | 5/1982 | Peiler | |
| RE31,257 E * | 5/1983 | Glaser et al. | 460/80 |
| 4,541,441 A | 9/1985 | Ichikawa et al. | |
| 4,993,991 A | 2/1991 | Yarmashev et al. | |
| 5,045,025 A | 9/1991 | Underwood | |
| 5,078,646 A | 1/1992 | Claas et al. | |
| 5,334,093 A | 8/1994 | Jensen et al. | |
| 5,342,239 A * | 8/1994 | West et al. | 460/69 |
| 5,445,563 A * | 8/1995 | Stickler et al. | 460/69 |
| 5,688,170 A | 11/1997 | Pfeiffer et al. | |
| 6,083,102 A * | 7/2000 | Pfeiffer et al. | 460/68 |
| 6,257,977 B1 * | 7/2001 | Moriarty | 460/68 |
| 6,375,564 B1 * | 4/2002 | Amann et al. | 460/66 |
| 6,468,152 B2 * | 10/2002 | Moriarty | 460/67 |
| 6,485,364 B1 * | 11/2002 | Gryspeerdt et al. | 460/107 |
| 6,494,782 B1 * | 12/2002 | Strong et al. | 460/71 |
| 6,500,063 B1 * | 12/2002 | Gryspeerdt | 460/79 |
| 6,884,161 B2 * | 4/2005 | Moriarty | 460/67 |
| 7,059,960 B2 * | 6/2006 | Mackin et al. | 460/71 |
| 7,059,961 B2 * | 6/2006 | Schenk | 460/109 |

(Continued)

FOREIGN PATENT DOCUMENTS

JP 2004275137 A 10/2004

*Primary Examiner* — Árpád Fábián-Kovács
(74) *Attorney, Agent, or Firm* — Patrick M. Sheldrake

(57) ABSTRACT

A combine threshing system includes a rotor having and in-feed area at a front end of the rotor and a rotor body configured to convey material along a helical path from the front end of the rotor body to a rear end of the rotor body. The system also includes a substantially cylindrical threshing chamber positioned circumferentially around and spaced apart from the rotor body. The threshing chamber includes a lower portion substantially concentric with the rotor body and having an inner surface positioned a first distance from an outer surface of the rotor body and an upper portion having a first inner surface substantially concentric with the rotor body and positioned the first distance from the outer surface and a second inner surface that is substantially concentric with the rotor body, positioned a second distance from the outer surface and is greater than the first distance.

20 Claims, 14 Drawing Sheets

(56) References Cited

U.S. PATENT DOCUMENTS

| | | | |
|---|---|---|---|
| 7,070,498 B2 * | 7/2006 | Grywacheski et al. | 460/68 |
| 7,118,475 B2 * | 10/2006 | Schenk | 460/109 |
| 7,226,355 B2 * | 6/2007 | Schenk | 460/109 |
| 7,393,274 B2 * | 7/2008 | Voss et al. | 460/109 |
| 7,462,101 B2 * | 12/2008 | Grywacheski et al. | 460/68 |
| 7,682,236 B2 * | 3/2010 | Buermann et al. | 460/109 |
| 7,717,777 B2 * | 5/2010 | Pope et al. | 460/69 |
| 8,221,202 B2 * | 7/2012 | Pope et al. | 460/68 |
| 8,231,446 B2 * | 7/2012 | Pope et al. | 460/62 |
| 8,251,787 B2 * | 8/2012 | Barrelmeyer et al. | 460/69 |
| 2007/0026913 A1 * | 2/2007 | Kuchar | 460/112 |
| 2008/0207287 A1 * | 8/2008 | McKee et al. | 460/69 |

\* cited by examiner

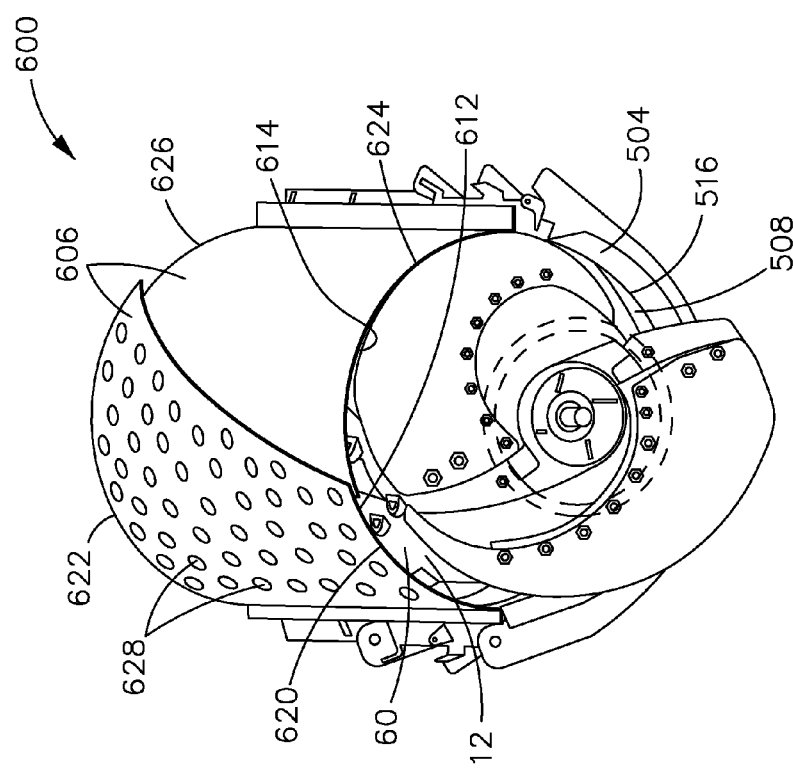

COMBINE STEPPED THRESHING CHAMBER

TECHNOLOGY FIELD

The present invention relates generally to harvesters, such as combine harvesters, and more particularly to a threshing chamber and a threshing system having a stepped threshing chamber.

BACKGROUND

A combine harvester is a machine that is used to harvest grain crops. The objective is to complete several processes, which traditionally were distinct, in one pass of the machine over a particular part of the field. Among the grain crops that may be harvested with a combine are wheat, oats, rye, barley, corn, soybeans, flax or linseed, and others. The waste (e.g., material other than grain (MOG)) discharged on the field includes the remaining dried stems and leaves of the crop which may be, for example, chopped and spread on the field as residue or baled for feed and bedding for livestock.

A combine harvester cuts crop using a wide cutting header. The cut crop may be picked up and fed into the threshing and separating mechanism of the combine, typically consisting of a rotating threshing rotor or cylinder to which grooved steel bars commonly referred to as rasp bars or threshing elements may be bolted. These rasp bars thresh and aid in separating the grains from the MOG through the action of the drum against the concaves, i.e., shaped "half drum," that may also be fitted with steel bars and a meshed grill, through which grain, chaff and smaller debris may fall, whereas the straw, being too big or long, is carried through to the outlet. The chaff, straw, and other undesired material (MOG) are returned to the field via a spreader mechanism.

In an axial flow combine, this threshing and separating system serves a primary separation function. The harvested crop is threshed and separated as it is conveyed between a longitudinally arranged rotor and the inner surface of a cylindrical chamber, the upper portion or top 180 degrees of the cylindrical chamber comprising a cage and the lower portion or bottom 180 degrees of the cylindrical chamber comprising threshing and separating concaves. The cut crop material, or crop mat, spirals and is conveyed along a helical path within the chamber until substantially only larger residue remains. When the residue reaches the end of the threshing drum, it is expelled out of the rear of the combine. Meanwhile, the grain, chaff, and other small debris fall through the concaves and grates onto a cleaning device or shoe. The grain still needs to be further separated from the chaff by way of a winnowing process.

Due to physical obstruction by the straw in the threshing chamber and because the rotation (e.g., angular velocity) of the crop mat around the rotor generally decreases from the center of the chamber (closer to the rotor) to the edges of the chamber (radially outward of the rotor), it becomes difficult to accelerate the grain radially outward through the crop mat to be separated out of perforations of the threshing chamber. By varying the clearance between the rotor and the threshing chamber, however, the crop mat may be compressed (pinched) to increase its angular velocity and then released to a less dense crop mat, allowing the grain to move more freely to the outside of the threshing chamber at the increased velocity to be separated out of the perforations of the threshing chamber.

U.S. Pat. No. 5,334,093, which is incorporated herein for its teachings on threshing chambers, has attempted to address the difficulty of accelerating the grain radially outward through the crop mat by a threshing chamber having a rotor which is off-set from the center of the threshing chamber toward the lower portion or bottom 180 degrees of the cylindrical chamber so that rotor and threshing chamber are non-concentric. The inventors have discovered a number of shortcomings, however, with conventional approach described in U.S. Pat. No. 5,334,093. For example, the crop mat is compressed during a counter-clockwise rotation along the bottom 180 degrees of the threshing chamber and expands during rotation along the top 180 degrees of the threshing chamber. The crop mat slows as it expands and continues to slow as it rotates along the entire top 180 degrees of the threshing chamber, which may undesirably cause the crop mat to ball-up or accumulate. When the crop mat is again compressed as it starts to rotate along the bottom 180 degrees of the threshing chamber, the crop mat now includes a stagnant clogged ball of material, making it difficult to accelerate the grain radially outward through clogged ball of material to be separated out of perforations of the threshing chamber.

SUMMARY

Embodiments of the present invention provide a combine threshing system that includes a rotor. The rotor includes an in-feed area at a front end of the rotor and a rotor body configured to convey material along a helical path from the front end of the rotor body to a rear end of the rotor body. The combine threshing system also includes a substantially cylindrical threshing chamber positioned circumferentially around and spaced apart from the rotor body. The threshing chamber includes a lower portion substantially concentric with the rotor body and has an inner surface positioned a first distance from an outer surface of the rotor body. The threshing chamber also includes an upper portion. The upper portion includes a first inner surface substantially concentric with the rotor body and positioned the first distance from the outer surface of the rotor body. The upper portion also includes a second inner surface substantially concentric with the rotor body. The second inner surface is discontinuous with the first inner surface and positioned a second distance from the outer surface of the rotor body. The second distance is greater than the first distance.

According to one embodiment of the invention, the inner surface of the lower portion and the first inner surface of the upper portion together occupy a circumferential perimeter greater than 180 degrees. The second inner surface of the upper portion occupies a circumferential perimeter less than 180 degrees.

According to an aspect of an embodiment of the invention, the inner surface of the lower portion and the first inner surface of the upper portion together occupy a circumferential perimeter of about 270 degrees and the second inner surface of the upper portion occupies a circumferential perimeter of about 90 degrees.

According to one embodiment of the invention, the inner surface of the lower portion occupies an area extending longitudinally from a front edge of the lower portion to a rear edge of the lower portion. The first inner surface of the upper portion occupies an area extending longitudinally from a front edge of the first inner surface to a rear edge of the first inner surface. The second inner surface of the upper portion occupies an area extending longitudinally from a front edge of the second inner surface to a rear edge of the second inner surface.

According to an aspect of an embodiment, the area of the first inner surface of the upper portion decreases circumferentially as it extends longitudinally from the front edge of the first inner surface to the rear edge of the first inner surface and the area of the second inner surface of the upper portion increases circumferentially as it extends longitudinally from the front edge of the second inner surface to the rear edge of the second inner surface.

According to one embodiment of the invention, the inner surface of the lower portion and the first inner surface of the upper portion together occupy a first front circumferential perimeter greater than 270 degrees at the front edges of the inner surface of the lower portion and the first inner surface of the upper portion. The inner surface of the lower portion and the first inner surface of the upper portion together occupy a first rear circumferential perimeter less than 270 degrees at the rear edges of the inner surface of the lower portion and the first inner surface of the upper portion. The second inner surface of the upper portion occupies a second front circumferential perimeter less than 90 degrees at the front edge of the second inner surface of the upper portion and the second inner surface of the upper portion occupies a second rear circumferential perimeter greater than 90 degrees at the rear edge of the second inner surface of the upper portion.

According to another embodiment, the area of the first inner surface of the upper portion continuously decreases circumferentially as it extends longitudinally from the front edge of the first inner surface to the rear edge of the first inner surface and the area of the second inner surface of the upper portion continuously increases circumferentially as it extends longitudinally from the front edge of the second inner surface to the rear edge of the second inner surface.

According to another embodiment, the area of the first inner surface of the upper portion discontinuously decreases circumferentially as it extends longitudinally from the front edge of the first inner surface to the rear edge of the first inner surface and the area of the second inner surface of the upper portion discontinuously increases circumferentially as it extends longitudinally from the front edge of the second inner surface to the rear edge of the second inner surface.

According to an aspect of an embodiment, the upper portion further comprises a plurality of sections extending longitudinally from the front edges of the first and second inner surfaces to the rear edges of the first and second inner surfaces. The area of the first inner surface discontinuously decreases circumferentially in steps along each section and the area of the second inner surface discontinuously increases circumferentially in steps along each section.

Embodiments of the present invention provide a combine threshing system that includes a lower portion of a substantially cylindrical threshing chamber having an inner surface positioned a first distance from a center of the threshing chamber. The combine threshing system also includes an upper portion of the substantially cylindrical threshing chamber. The upper portion includes a first inner surface positioned circumferentially at a first distance from the center of the threshing chamber and a second inner surface discontinuous with the first inner surface and positioned circumferentially at a second distance from the center of the threshing chamber. The second distance being less than the first distance.

According to one embodiment, the inner surface of the lower portion and the first inner surface of the upper portion together occupy a circumferential perimeter greater than 180 degrees and the second inner surface of the upper portion occupies a circumferential perimeter less than 180 degrees.

According to another embodiment, the inner surface of the lower portion occupies an area extending longitudinally from a front edge of the lower portion to a rear edge of the lower portion. The first inner surface of the upper portion occupies an area extending longitudinally from a front edge of the first inner surface to a rear edge of the first inner surface. The second inner surface of the upper portion occupies an area extending longitudinally from a front edge of the second inner surface to a rear edge of the second inner surface.

According to another embodiment, the area of the first inner surface of the upper portion decreases circumferentially as it extends longitudinally from the front edge of the first inner surface to the rear edge of the first inner surface and the area of the second inner surface of the upper portion increases circumferentially as it extends longitudinally from the front edge of the second inner surface to the rear edge of the second inner surface.

According to an aspect of an embodiment, the inner surface of the lower portion and the first inner surface of the upper portion together occupy a first front circumferential perimeter greater than 270 degrees at the front edges of the inner surface of the lower portion and the first inner surface of the upper portion. The inner surface of the lower portion and the first inner surface of the upper portion together occupy a first rear circumferential perimeter less than 270 degrees at the rear edges of the inner surface of the lower portion and the first inner surface of the upper portion. The second inner surface of the upper portion occupies a second front circumferential perimeter less than 90 degrees at the front edge of the second inner surface of the upper portion. The second inner surface of the upper portion occupies a second rear circumferential perimeter greater than 90 degrees at the rear edge of the second inner surface of the upper portion.

According to another aspect of an embodiment, the area of the first inner surface of the upper portion continuously decreases circumferentially as it extends longitudinally from the front edge of the first inner surface to the rear edge of the first inner surface and the area of the second inner surface of the upper portion continuously increases circumferentially as it extends longitudinally from the front edge of the second inner surface to the rear edge of the second inner surface.

According to an aspect of an embodiment, the area of the first inner surface of the upper portion discontinuously decreases circumferentially as it extends longitudinally from the front edge of the first inner surface to the rear edge of the first inner surface and the area of the second inner surface of the upper portion discontinuously increases circumferentially as it extends longitudinally from the front edge of the second inner surface to the rear edge of the second inner surface.

According to an aspect of an embodiment, the upper portion further comprises a plurality of sections extending longitudinally from the front edges of the first and second inner surfaces to the rear edges of the first and second inner surfaces. The area of the first inner surface discontinuously decreases circumferentially in steps along each section and the area of the second inner surface discontinuously increases circumferentially in steps along each section.

Embodiments of the present invention provide a method for separating grain from material other than grain that includes feeding crop material into a substantially cylindrical threshing chamber positioned circumferentially around a rotor body and conveying crop material along a helical path from a front end of the rotor body to a rear end of the rotor body and within a threshing chamber. The threshing chamber includes a lower portion substantially concentric with the rotor body and having an inner surface positioned a first distance from an outer surface of the rotor body and an upper portion. The upper portion includes a first inner surface substantially concentric with the rotor body and positioned the first distance from the outer surface of the rotor body and a second inner surface substantially concentric with the rotor body. The second inner surface is discontinuous with the first inner surface and positioned a second distance from the outer surface of the rotor body. The second distance is greater than the first distance. The method also includes compressing the crop material between: (i) the outer surface of the rotor body and the inner surface of the lower portion; and (ii) the outer surface of the rotor body and the first inner surface of the upper portion. The method further includes decompressing the crop material between an outer surface of the rotor body and the second inner surface of the upper portion.

According to another embodiment, compressing the crop material includes increasing the velocity of the crop material being conveyed within the threshing chamber.

According to another embodiment, compressing the crop material includes compressing the crop material a plurality of times between (i) the outer surface of the rotor body and an area of the inner surface of the lower portion extending longitudinally from a front edge of the lower portion to a rear edge of the lower portion, and (ii) the outer surface of the rotor body and an area of the first inner surface of the upper portion extending longitudinally from a front edge of the first inner surface to a rear edge of the first inner surface. Decompressing the crop material includes decompressing the crop material a plurality of times between the outer surface of the rotor body and an area of the second inner surface of the upper portion extending longitudinally from a front edge of the second inner surface to a rear edge of the second inner surface.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 6A illustrates a front perspective view of an exemplary combine threshing system having a threshing chamber that includes upper portion surfaces decreasing and increasing circumferentially for use with embodiments of the present invention;

DETAILED DESCRIPTION OF ILLUSTRATED EMBODIMENTS

The shortcomings of conventional crop threshing approaches have motivated the creation of embodiments of the present invention. The present invention is directed to embodiments of a combine stepped threshing chamber and a method for separating grain from material other than grain. Embodiments of the present invention vary the clearance between the rotor and the threshing chamber along a portion of the top 180 degrees of rotation, decreasing the area where the crop material expands to less than 180 degrees of rotation and increasing the area where the crop material is compressed to greater than 180 degrees of rotation, allowing the grain more time to speed up and less time to slow down, thereby reducing clogging within the threshing chamber.

Figure 1:
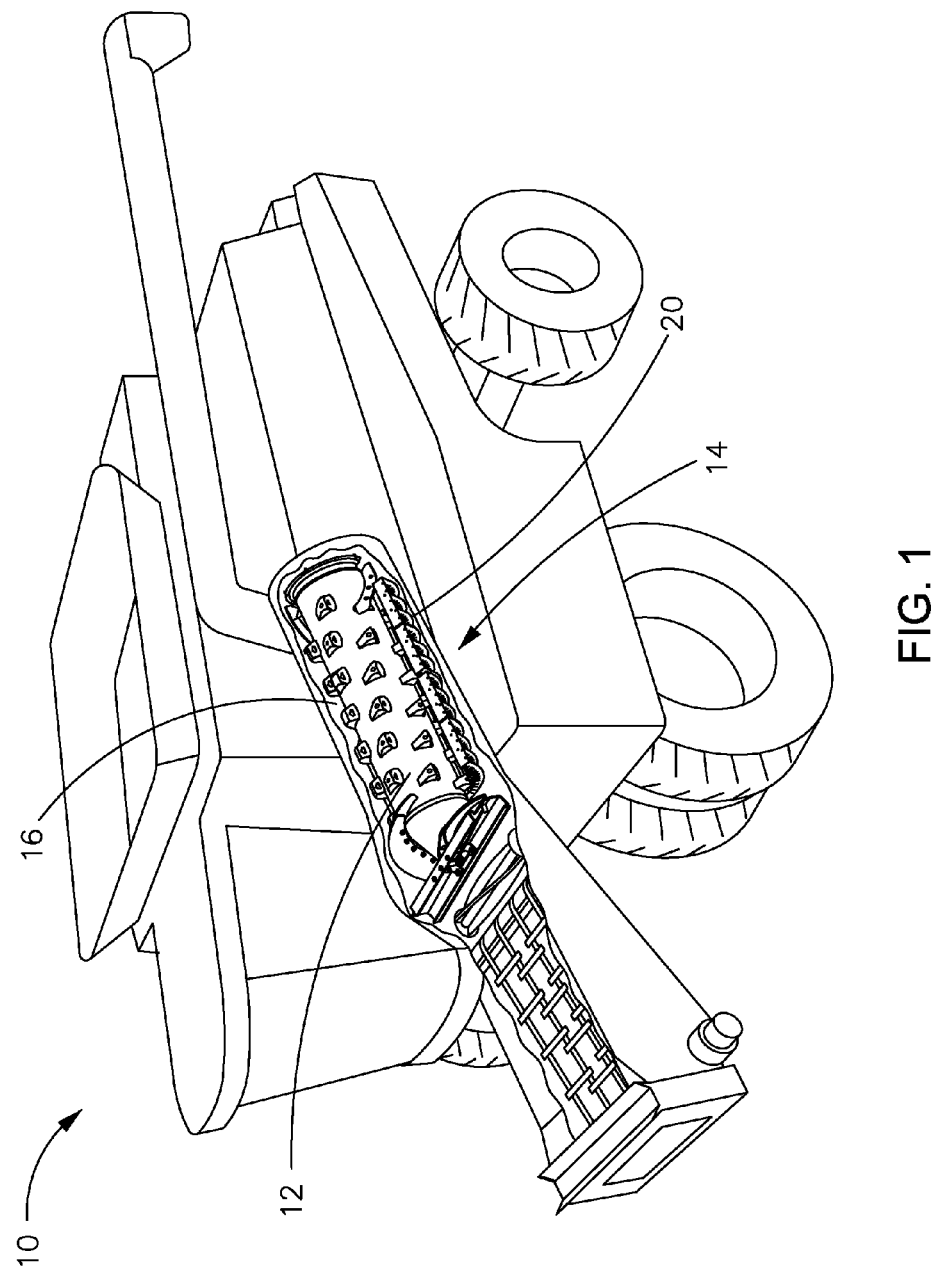
FIG. 1 is a perspective view of an exemplary harvester for use with embodiments of the present invention.

FIG. 1 shows an exemplary agricultural combine 10. As shown in FIG. 1, the combine 10 includes a longitudinally axially arranged threshing and separation system 14. The helical bar concave 20, may also be used with combines having transversely aligned threshing and separation system in a combine.

In the illustrated embodiment, threshing and separation system 14 is axially arranged, in that it includes a cylindrical threshing rotor 12 conventionally supported and rotatable in a predetermined direction about a rotational axis therethrough for conveying a flow of crop material in a helical flow path through a threshing chamber 16 extend circumferentially around the rotor 12. As shown, concaves 20 may extend circumferentially around the rotor 12 and the flow of crop may pass in the space between the spinning rotor and the concaves. As the crop material flows through the threshing and separation system 14, the crop material including, for example, grain, straw, legumes, and the like, will be loosened and separated from crop residue or waste such as, for example, husks, cobs, pods, and the like, and the separated materials may be carried away from the threshing and separation system 14. As threshed crop falls through the grates in concaves 20, it is moved by a conveyor system to a grain bed in a cleaning system (see FIG. 4).

Figure 2:
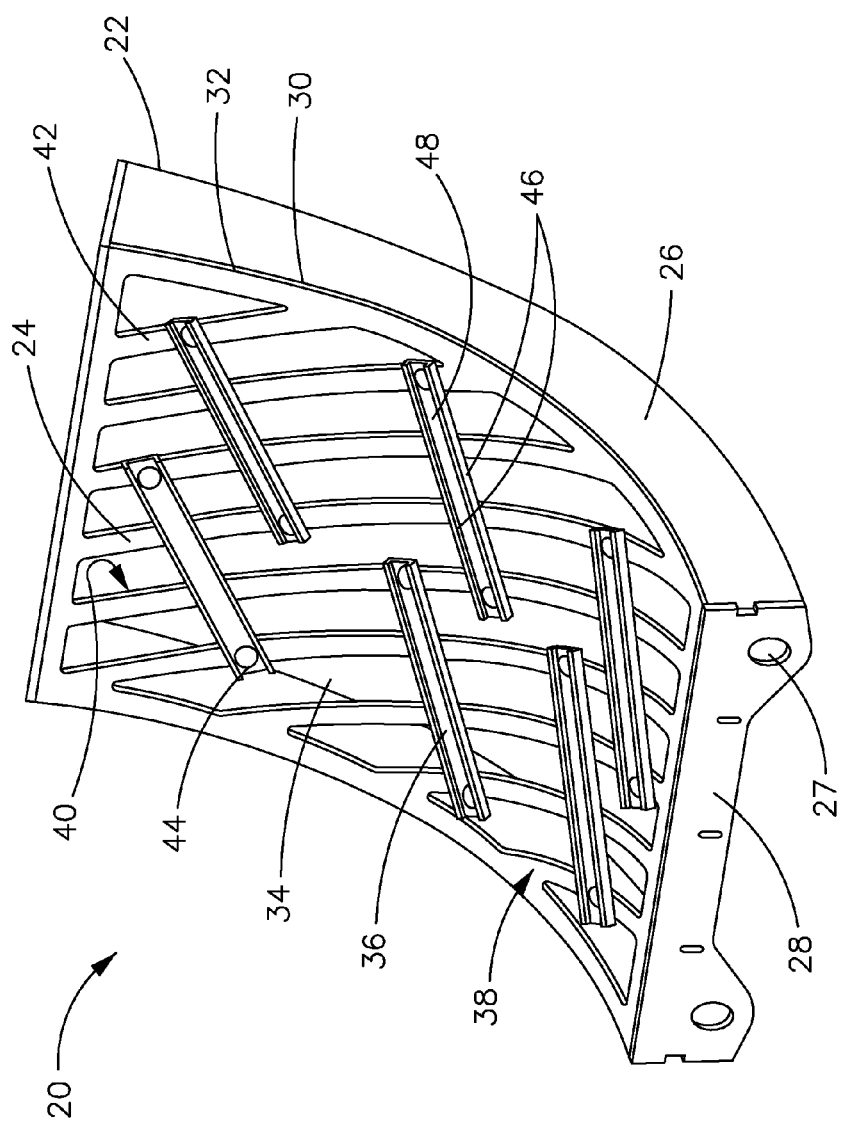
FIG. 2 is a perspective view of an exemplary concave for use with embodiments of the present invention.

FIG. 2 shows of an exemplary concave 20 for use with certain embodiments of the present invention. In the embodiment shown in FIG. 2, the concaves can include rub bars or vanes (e.g. transport vanes) that define a helical pattern. In other embodiments, the rub bars may be oriented in any manner chosen by a person skilled in the art or by an operator. For example, the rub bars or vanes may be oriented substantially horizontal, perpendicular to the flow of crop material, or may be adjustable via bolts or electrical actuators. In the example shown in FIG. 2, the concave includes a frame 22 mounted to a grate 24. As shown, the frame 22 includes side walls 26 and end walls 28 extending between and connected to the two side walls 26. The side walls 26 include a curved top edge 30 having a predetermined radius. The side walls 26 and end walls 28 define a top opening 32.

As shown in FIG. 2, the grate 24 includes a plurality of cutouts (openings) 34 and a plurality of rub bars 36. The grate 24 is connected (e.g., welded) over the top opening 32 in the frame 22. The grate 24 includes an inside radius corresponding to the radius of the curved top edge 30 of the side walls 24. The radius is measured from the longitudinal axis of rotation of the rotor and substantially corresponds to the curvature of an outer circumference of the rotor 12. The grate 24 includes an interior surface 38 (also referred to inside surface or top surface) and an exterior surface 40 (also referred to outside surface or bottom surface). The interior surface 38 comprises a concave functional surface for contacting a crop.

In the exemplary concave shown in FIG. 2, the grate includes corresponding mounting framework or mounting frames 42 in the concave's functional surface separating the cutouts 34. As shown, the grate 24 also includes holes 44 in the mounting framework 42 for mounting the rub bars 36 to the grate 24. In some embodiments, these rub bars or vanes can be mounted such that they are manually adjustable or adjustable via an electrically controlled mechanism to allow the pitch angle of the rub bars or vanes to be adjustable remotely or in response to an electrical input. Embodiments of the present invention can be used with any concave separator system available to a person having skill in the art.

Figure 3A:
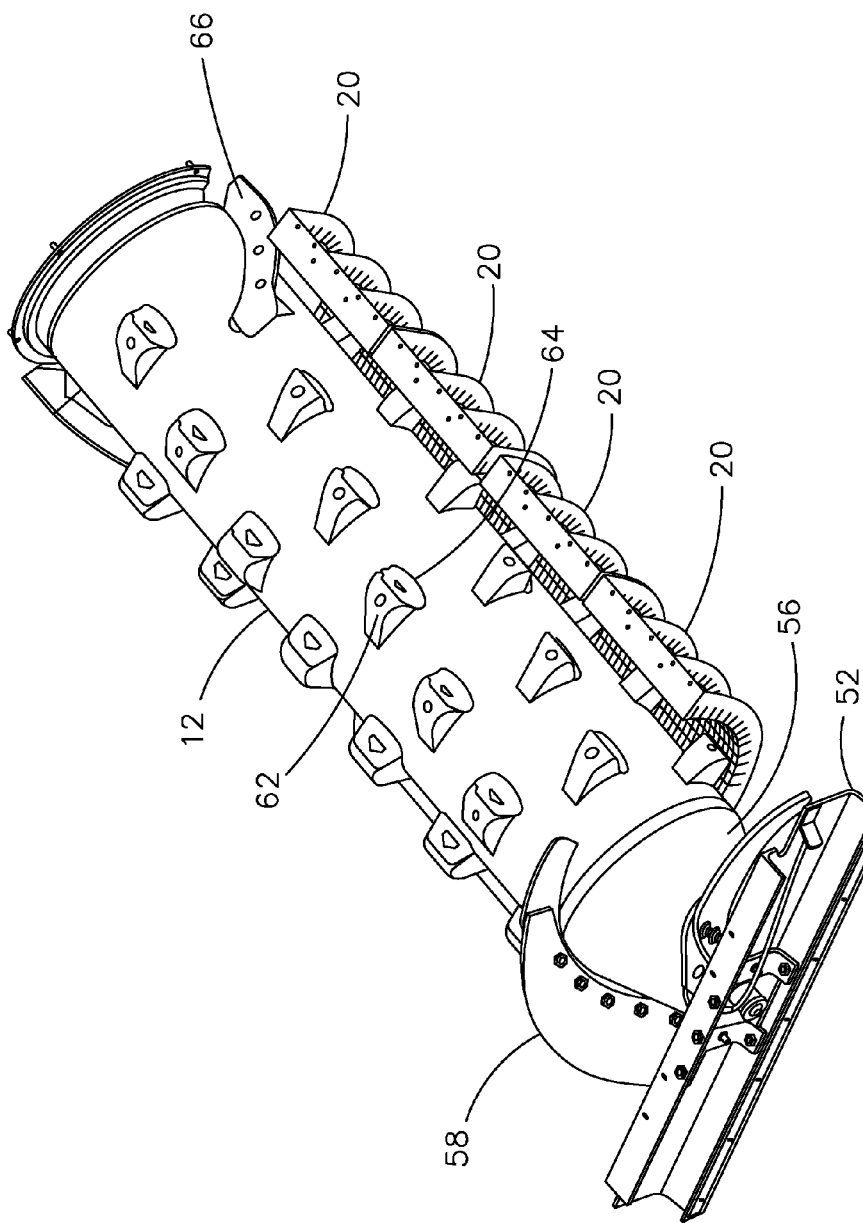
FIG. 3A is a perspective view of an exemplary threshing system for use with embodiments of the present invention.
Figure 3B:
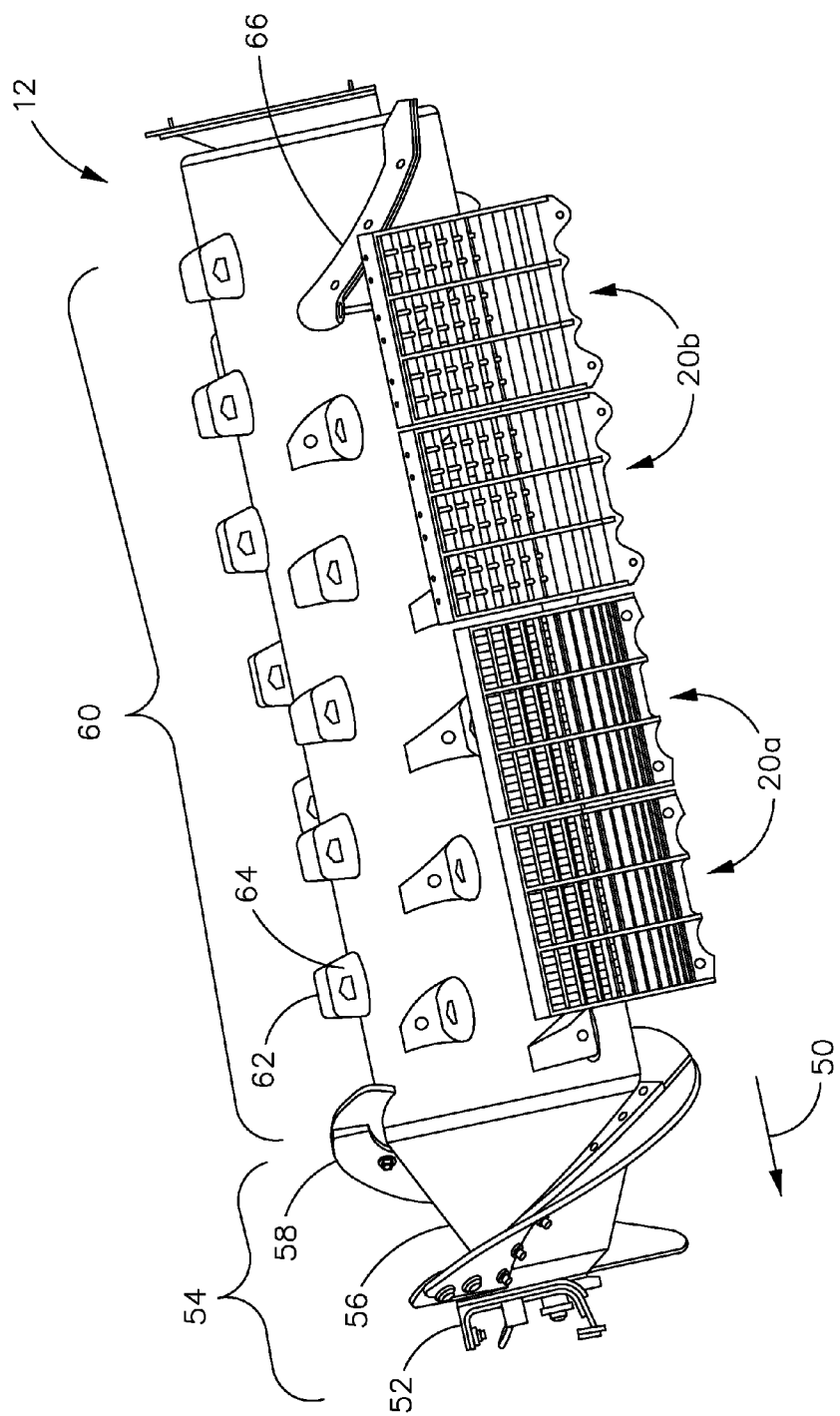
FIG. 3B is a side view of a threshing system for use with embodiments of the present invention.

FIG. 3A and FIG. 3B show an exemplary rotor 12 and concave 20, 20a, 20b arrangement for use with some embodiments of the present invention. It will be appreciated that the threshing mechanism can include more than one threshing rotor. As shown, the concaves 20, 20a, 20b may be mounted in close proximity to the rotor 12 with a space or clearance therebetween for a crop to flow. In a typical combine 10, an individual concave 20, 20a, 20b may wrap approximately 150 to 160 degrees around the rotor 12. The concave 20 may comprise one piece or may be split into multiple parts. For example, the concave may be split into two halves that may be connected together end-to-end to form a full concave. As shown in FIG. 2, end walls 26 may include one or more openings or holes 27 for receiving a fastener (e.g., a bolt) for connecting the two halves of the concave together. This feature may be advantageous, for example, on larger combines to facilitate handling, installation and removal.

Further, H-frames may be provided for mounting of the concave or concaves. In the embodiment illustrated in FIG. 3A and FIG. 3B, two H-frame boxes may be provided having four module positions or mounting locations for receiving individual concaves. A complete combine may include, for example, four left concaves and four right concaves to produce a fully off-set threshing module.

The concaves may be configurable and interchangeable between positions to allow the combine to work with a variety of threshable crops. The concave modules may be selected and positioned to thresh and separate grain appropriately at a relatively high capacity. For example, the concave in the number 1 position and the number 4 position may be interchangeable and the concaves in the number 2 position and the number 3 position may be interchangeable. Typically, concaves on the right side may be interchangeable with one another (switching position front to back) and concaves on the left side may be interchangeable with one another (switching position front to back). Typically, concaves from the left side may not be exchanged with concaves on the right side due to mounting configurations.

As shown in FIG. 3A and FIG. 3B, the front concaves may have a small mounting frame configuration and the back concaves have a larger mounting frame configuration—i.e., more percent open area. In some embodiments, the forward concaves 20a in the concave area can be adjusted separately from the rear concaves 20b, sometimes referred to as a grate area.

FIG. 3A and FIG. 3B show a top side view and a left side view, respectively, of an exemplary rotor 12. As shown, the rotor 12 rotates clockwise when viewed from a position at the rear of the rotor, looking forward to the direction of travel (arrow 50). That is, the illustrated rotor 12 of FIG. 3B is rotating such that the top of the rotor is going into the page and the bottom of the rotor would be coming out of the page. A rotor may also rotate counter-clockwise.

As shown, the rotor 12 includes a front rotor support 52 at the front (the left side in the figure). The illustrated support includes a front rotor support 52 having a C-channel curvature that holds up and supports the rotor 12. The in-feed area 54 of the rotor is from the bearing support plate or that rotor support channel to the number one module position which is mainly constructed of the conical grey cone 56 and the helical auger plates 58.

After this transition area 54, the crop goes through an acceleration period in which you have a feed device that is feeding crop from the header. The crop is fed at some factor of acceleration, which may depend, for example, on how fast the rotor is spinning and how fast the feeder is going, etc. But generally, there is always an increase in speed of the crop in this region of the combine. The motion of the rotor 12 also acts to thin the crop and transmits it rearward. The rotor conveys the crop into the thresher section or rotor body 60 of the rotor, which is the tubular portion. Rasp bars 62 are mounted using conventional techniques (e.g., bolted) to the barnacles or the rasp bar supports 64. The rasp bar supports 64 may be connected using conventional techniques (e.g., welded) to the cylindrical portion of the rotor 12. In some embodiments, rasp bars 62 may be electrically adjustable such as controlled by electrically controlled hydraulic actuators.

As shown, a helical kicker 66 may be provided at the rear of the rotor (right side in the figure) to expel the crop out of the threshing chamber. Typically, this expelled material goes either onto the ground or into a collection device, such as a straw chopper or a discharge beater, in which a subsequent action may be taken on the straw. As the crop flows through the threshing chamber, it flows in a cylindrical or spiral pattern as a result of the rotating rotor. When it gets to the rear of the rotor, that rotor ends and so does the crop flow path. The helical kicker 66 helps ensure full discharge of the crop from the threshing chamber.

In the illustrated rotor arrangement, concaves 20, 20a, 20b are adjustable to set the threshing clearance (the distance between the rotor (and rotor rasp bars) and the concave (and concave rub bars). For example, if threshing wheat, an operator might tighten up the clearance due to the small kernel size. For corn, an operator might want a more open area to allow for cobs, and the adjustable feature allows an operator to tailor and adjust for threshing based on the particular crop. This position is where the grinding and threshing action occurs and where most of the grain is threshed.

This customization and adjustability to achieve the desired grind or to rub the crop adequately to thresh the grain may be determined based on a number of factors, such as the crop, plant characteristics, the growing seasons, and the like. For example, sometimes it is desirable to run a very wide clearance for wheat, sometimes it is required to run a very tight clearance for hard to thresh wheat. The exact arrangement of concaves 20, 20*a*, 20*b* relative to the threshing rotor 12 can be adjusted to achieve the desired clearance. The resulting arrangement can affect the distribution of the falling grain as it falls through the grates in the concaves onto the conveying system.

Figure 4:
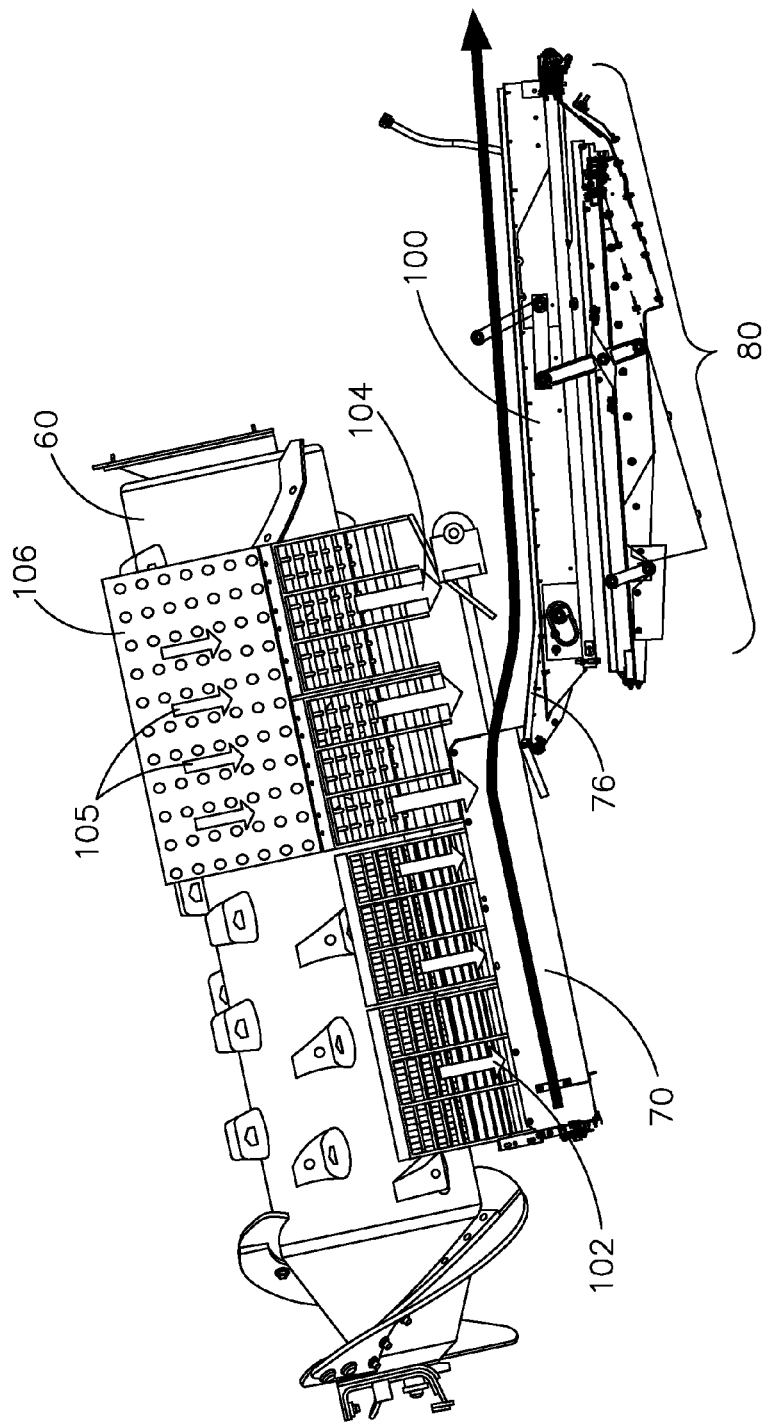
FIG. 4 is a side view of exemplary harvesting systems, illustrating the flow of material out of a cylindrical threshing chamber, for use with embodiments of the present invention.

As shown in FIG. 4 by arrows 102, 104 and 105 respectively, grain may fall through openings in forward concaves 20*a*, through openings in rear concaves 20*b*, and through openings in rear cage 106, landing on a conveyor system 70 or a grain pan 76. Grain landing on the conveyor system 70 is conveyed to the back of the combine via a conveying action. In this manner, the conveying system acts as a collection system for the threshed crop. The threshed crop follows path 100 as shown in FIG. 4. After passing grain pan 76, threshed crop is moved on to a grain bed in cleaning system 80.

Figure 5A:
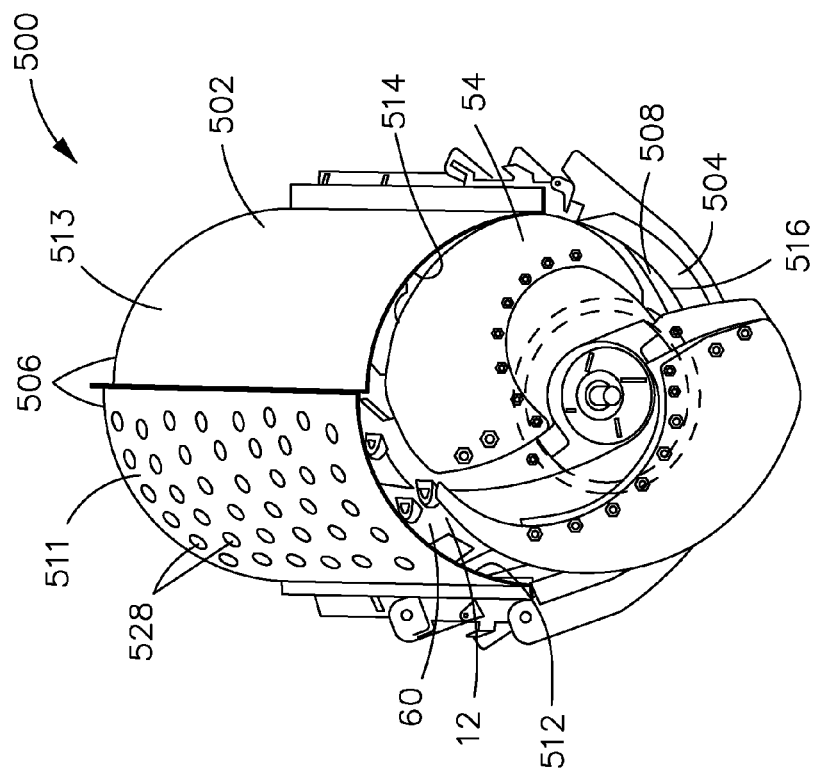
FIG. 5A illustrates a front perspective view of an exemplary combine threshing system having a threshing chamber with discontinuous upper portion surfaces for use with embodiments of the present invention.
Figure 5B:
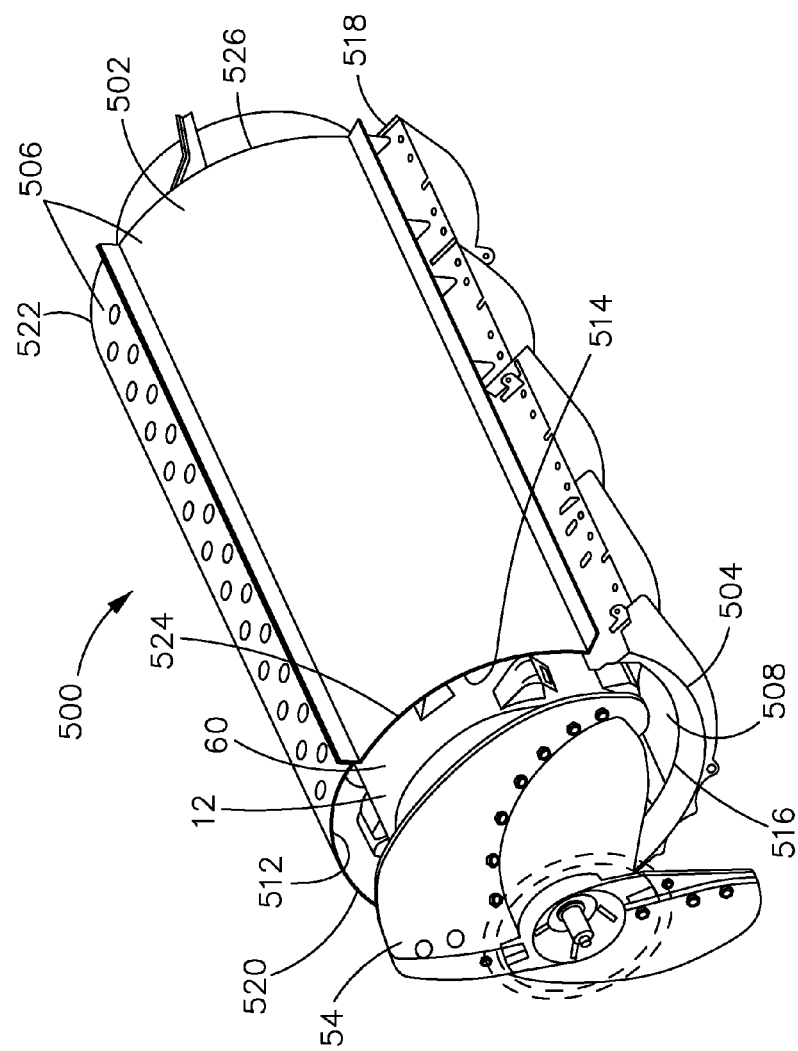
FIG. 5B illustrates a side perspective view of the combine threshing system shown at FIG. 5A for use with embodiments of the present invention.
Figure 5C:
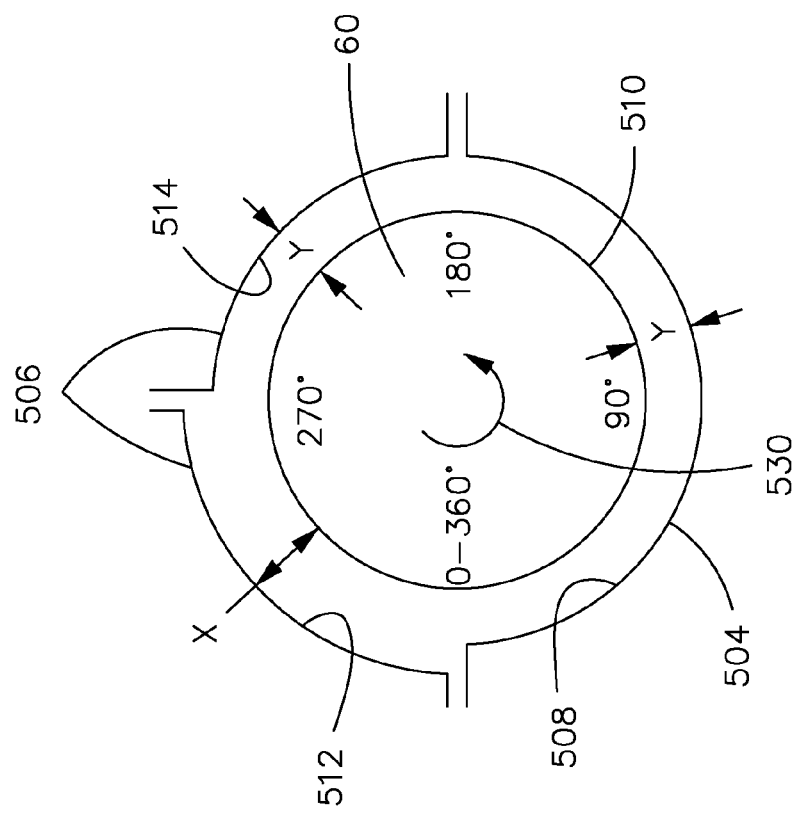
FIG. 5C illustrates a cut-away view of the combine threshing system at FIG. 5A, showing a rotor, a lower portion of the threshing chamber and the discontinuous upper portion surfaces of the threshing chamber for use with embodiments of the present invention.

FIG. 5A illustrates a front perspective view of a combine threshing system having a threshing chamber with discontinuous upper portions for use with embodiments of the present invention. FIG. 5B illustrates a side perspective view of the combine threshing system shown at FIG. 5A for use with embodiments of the present invention. FIG. 5C illustrates a cut-away view of the combine threshing system shown at FIG. 5A showing a rotor, a lower portion of the threshing chamber and the discontinuous upper portions of the threshing chamber for use with embodiments of the present invention. The combine threshing system 500, shown in FIG. 5A and FIG. 5B, may be incorporated into various types of vehicles, such as a combine, a tractor, and other agricultural vehicles. The combine threshing system 500, shown in FIG. 5A and FIG. 5B includes rotor 12 having an in-feed area at a front end of rotor 12 and rotor body 60 configured to convey material along a helical path from the front end of the rotor body to a rear end of the rotor body 60.

The combine threshing system 500 also includes a substantially cylindrical threshing chamber 502 positioned circumferentially around the rotor body 60. As shown at FIG. 5C, threshing chamber 502 includes a lower portion 504 and an upper portion 506. Lower portion 504 is substantially concentric with the rotor body 60 and has an inner surface 508 positioned a first distance y from an outer surface 510 of the rotor body 60. Arrow 530 indicates the direction of rotation as counter-clockwise according to the exemplary embodiment illustrated at FIG. 5A through FIG. 5C. In some embodiments, however, the direction of rotation of a rotor may be clockwise.

An upper portion may include first and second sub-portions having respective inner surfaces. It is also contemplated, however, that a threshing chamber may include a unitary upper portion having first and second inner surfaces substantially concentric with a rotor body, discontinuous with each other and positioned at different distances from an outer surface of the rotor body. As shown at FIG. 5C, upper portion 506 of threshing chamber 502 includes a first sub-portion 513 having a first inner surface 514 substantially concentric with rotor body 60 and positioned the first distance y from the outer surface 510 of rotor body 60. Upper portion 506 of threshing chamber 502 also includes a second sub-portion 511 having a second inner surface 512 substantially concentric with rotor body 60. The second inner surface 512 of upper portion 506 is discontinuous with the first inner surface 514. The second inner surface 512 of upper portion 506 is also positioned a second distance x from the outer surface 510 of rotor body 60. As shown, the second distance x is greater than the first distance y.

Second inner surface 512 also includes perforations 528 configured for separating grain from material other than grain. It is contemplated that a first inner surface, such as first inner surface 514 may also include perforations. The amount, sizes, shapes and location of the perforations 528 shown at FIG. 5A are exemplary. Perforations may be configured to be of different amounts, shapes and sizes than the perforations shown at FIG. 5A.

According to one embodiment, the inner surface of the lower portion and the first inner surface of the upper portion together may occupy a circumferential perimeter greater than 180 degrees and the second inner surface of the upper portion may occupy a circumferential perimeter less than 180 degrees. For example, as shown at FIG. 5C, inner surface 508 of lower portion 504 and first inner surface 514 of upper portion 506 together occupy a circumferential perimeter greater than 180 degrees and second inner surface 512 of upper portion 506 occupies a circumferential perimeter less than 180 degrees.

According to an aspect of an embodiment, the inner surface of the lower portion and the first inner surface of the upper portion together may occupy a circumferential perimeter of about 270 degrees and the second inner surface of the upper portion occupies a circumferential perimeter of about 90 degrees. For example, as shown at FIG. 5C, inner surface 508 of lower portion 504 and first inner surface 514 of upper portion 506 together occupy a circumferential perimeter of about 270 degrees and second inner surface 512 of upper portion 506 occupies a circumferential perimeter of about 90 degrees (between 270 degrees and 360 degrees).

In some embodiments, the inner surface of the lower portion may occupy an area extending longitudinally from a front edge of the lower portion to a rear edge of the lower portion. For example, as shown at FIG. 5B, the inner surface 508 of the lower portion 504 may occupy an area extending longitudinally from a front edge 516 of the lower portion 504 to a rear edge 518 of the lower portion 504. In an aspect of some embodiments, the first inner surface of the upper portion may occupy an area extending longitudinally from a front edge of the first inner surface to a rear edge of the first inner surface and the second inner surface of the upper portion occupies an area extending longitudinally from a front edge of the second inner surface to a rear edge of the second inner surface. For example, as shown at FIG. 5B, the first inner surface 514 of the upper portion 506 occupies an area extending longitudinally from a front edge 524 of the first inner surface 514 to a rear edge 526 of the first inner surface 514 and the second inner surface 512 of the upper portion 506 occupies an area extending longitudinally from a front edge 520 of the second inner surface 512 to a rear edge 522 of the second inner surface 512.

Figure 6B:
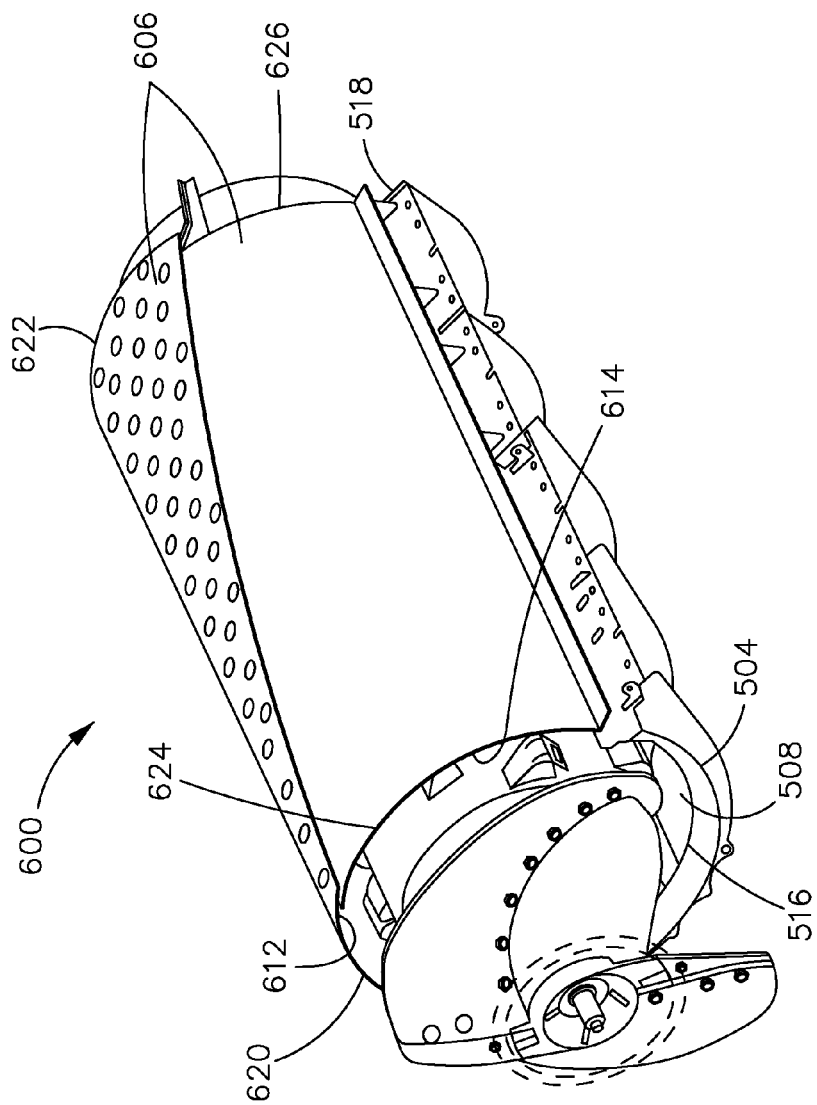
FIG. 6B illustrates a side perspective view of the combine threshing system shown at FIG. 6A for use with embodiments of the present invention.

FIGS. 6A and 6B illustrate perspective views of a combine threshing system 600 having upper portion surfaces that decrease and increasing circumferentially as they extend longitudinally from the front to the rear of the upper portion. For example, according to one embodiment shown at FIG. 6A and FIG. 6B, the area of the first inner surface 614 of the upper portion 606 decreases circumferentially as it extends longitudinally from the front edge 624 of the first inner surface 614 to the rear edge 626 of the first inner surface 614. Further, the area of the second inner surface 612 of the upper portion 606 increases circumferentially as it extends longitudinally from the front edge 620 of the second inner surface 612 to the rear edge 622 of the second inner surface 612.

As shown, second inner surface 612 may also include perforations 628 configured for separating grain from material other than grain. It is contemplated that a first inner surface, such as first inner surface 624, may also include perforations. The amount, sizes, shapes and location of the perforations 628 shown at FIG. 6A are exemplary. Perforations may be configured to be of different amounts, shapes and sizes than the perforations shown at FIG. 6A.

Figure 6C:
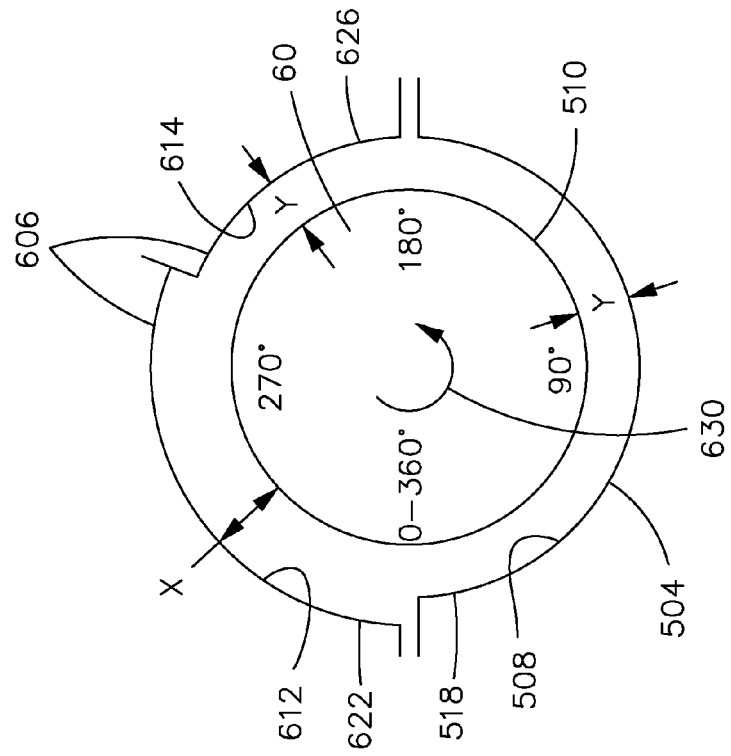
FIG. 6C illustrates a cut-away view at the front edges of the combine threshing chamber shown at FIG. 6A for use with embodiments of the present invention.

According to one aspect of the embodiment, the inner surfaces may be configured to have differing circumferential perimeters measured in degrees along cross sections of the threshing chamber. For example, FIG. 6C illustrates a cut-away view near the front edges of the combine threshing chamber shown at FIGS. 6A and 6B. As shown at FIG. 6C, the inner surface 508 of the lower portion 504 and the first inner surface 614 of the upper portion 606 together occupy a first front circumferential perimeter greater than 270 degrees at the front edge 516 of the inner surface 508 and the front edge 624 of the first inner surface 614. The combined circumferential perimeter of the inner surface 508 and the first inner surface 614 at their front edges may be measured starting at 0 degrees rotating counter-clockwise and ending after 270 degrees, as shown at FIG. 6C. Further, the second inner surface 612 of the upper portion 606 occupies a second front circumferential perimeter less than 90 degrees at the front edge 620 of the second inner surface 612 of the upper portion 606. The circumferential perimeter of second inner surface 612 at front edge 620 may be measured starting after 270 degrees rotating counter-clockwise and ending at 360 degrees totaling a circumferential perimeter of less than 90 degrees, as shown at 6C.

Figure 6D:
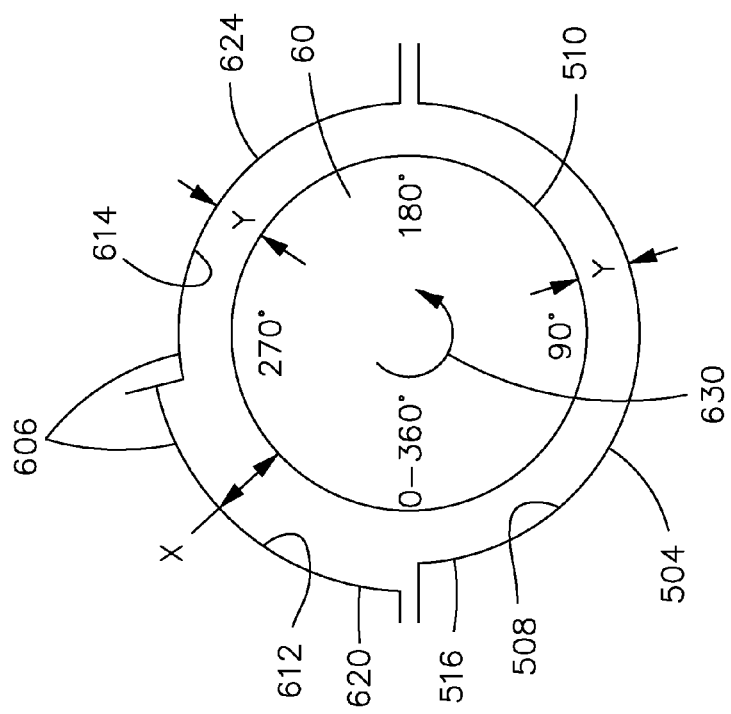
FIG. 6D illustrates a cut-away view at the rear edges of the combine threshing system at FIG. 6A for use with embodiments of the present invention.

FIG. 6D illustrates a cut-away view at rear edges of the combine threshing chamber shown at FIGS. 6A and 6B. As shown at FIG. 6D, the inner surface 508 of the lower portion 504 and the first inner surface 614 of the upper portion 606 together occupy a first rear circumferential perimeter less than 270 degrees at the rear edge 518 of the inner surface 508 and the rear edge 626 of the first inner surface 614. The combined circumferential perimeter of the inner surface 508 and the first inner surface 614 at their rear edges may be measured starting at 0 degrees rotating counter-clockwise and ending before 270 degrees, as shown at FIG. 6D. Further, the second inner surface 612 of the upper portion 606 occupies a second rear circumferential perimeter greater than 90 degrees at the rear edge 622 of the second inner surface 612. The circumferential perimeter of second inner surface 612 at rear edge 622 may be measured starting before 270 degrees, rotating counter-clockwise, and ending at 360 degrees, equaling a circumferential perimeter of greater than 90 degrees, as shown at 6D.

In some embodiments, inner surfaces may continuously increase and decrease circumferentially as they extend longitudinally from front edges to rear edges of the threshing chamber. The combine threshing system shown at FIG. 6A through 6D illustrate inner surfaces which continuously increase and decrease circumferentially as they extend longitudinally from front edges to rear edges of the threshing chamber. For example, the first inner surface 614 of the upper portion 606 continuously decreases circumferentially as it extends longitudinally from the front edge 624 of the first inner surface 614 to the rear edge 626 of the first inner surface 614. The area of the second inner surface 612 of the upper portion 606 continuously increases circumferentially as it extends longitudinally from the front edge 620 of the second inner surface 612 to the rear edge 622 of the second inner surface 612.

Figure 7A:
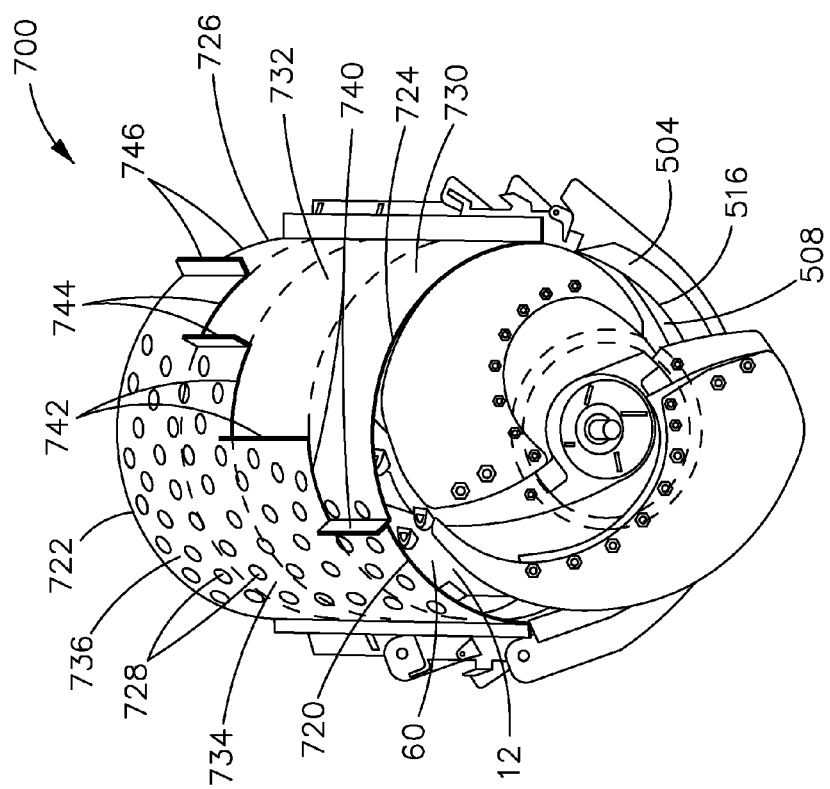
FIG. 7A illustrates a front perspective view of an exemplary combine threshing system having a threshing chamber that includes upper portion surfaces discontinuously decreasing and increasing circumferentially for use with embodiments of the present invention.
Figure 7B:
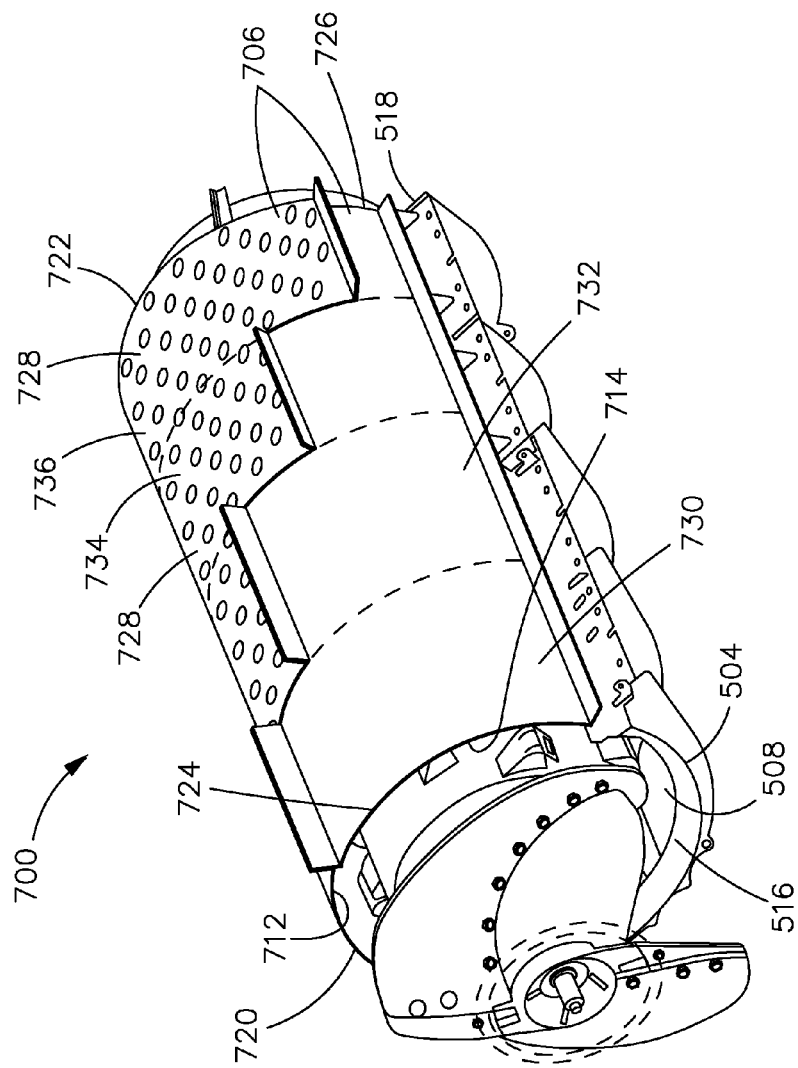
FIG. 7B illustrates a side perspective view of the combine threshing system shown at FIG. 7A for use with embodiments of the present invention.

In other embodiments, inner surfaces may discontinuously increase and decrease circumferentially as they extend longitudinally from front edges to rear edges of the threshing chamber. The combine threshing system shown at FIG. 7A and FIG. 7B illustrate inner surfaces which discontinuously increase and decrease circumferentially as they extend longitudinally from front edges to rear edges of the threshing chamber. For example, the area of the first inner surface 714 of the upper portion 706 discontinuously decreases circumferentially as it extends longitudinally from the front edge 724 of the first inner surface 714 to the rear edge 726 of the first inner surface 714. The area of the second inner surface 712 of the upper portion 706 discontinuously increases circumferentially as it extends longitudinally from the front edge 720 of the second inner surface 712 to the rear edge 722 of the second inner surface 712.

According to one embodiment, the discontinuous increase and decrease may be configured by stepping the first and second inner surfaces circumferentially along a plurality of sections. The sections may be configured as separate removable cages, as indicated by the dotted lines at FIG. 7A and FIG. 7B. The sections may be configured to be independent from the separate removable cages. Each of the first and second surfaces extending longitudinally across each section may be part of a unitary structure. It is also contemplated, however, that each of the first and second surfaces may be part of separate structures. For example, each structure may be part of a section.

The upper portion 706 of combine threshing system 700, shown at FIGS. 7A and 7B, includes a plurality of sections 730, 732, 734 and 736 extending longitudinally from the front edges 720 and 724 of the second inner surface 712 and first inner surface 714, respectively, to the rear edges 722 and 726 of the first inner surface 712 and second inner surface 714, respectively. The area of the first inner surface 714 discontinuously decreases circumferentially in steps 740, 742, 744 and 746 along each section 730, 732, 734 and 736. The area of the second inner surface 712 discontinuously increases circumferentially in the steps 730, 732, 734 and 736 along each section 730, 732, 734 and 736. At least one of the sections 730, 732, 734 and 736 of the second inner surface 712 (being of a greater distance x from the rotor body 60 than the distance y of the first inner surface) may include perforations 728. The sizes, shapes and location of the perforations 728 shown at FIG. 7A and FIG. 7B are exemplary. It is contemplated that a first inner surface may include perforations along each section. It is also contemplated that a second inner surface may also include perforations. Perforations may be configured to be of different shapes and sizes than the perforations shown at FIG. 7A and FIG. 7B.

Figure 8:
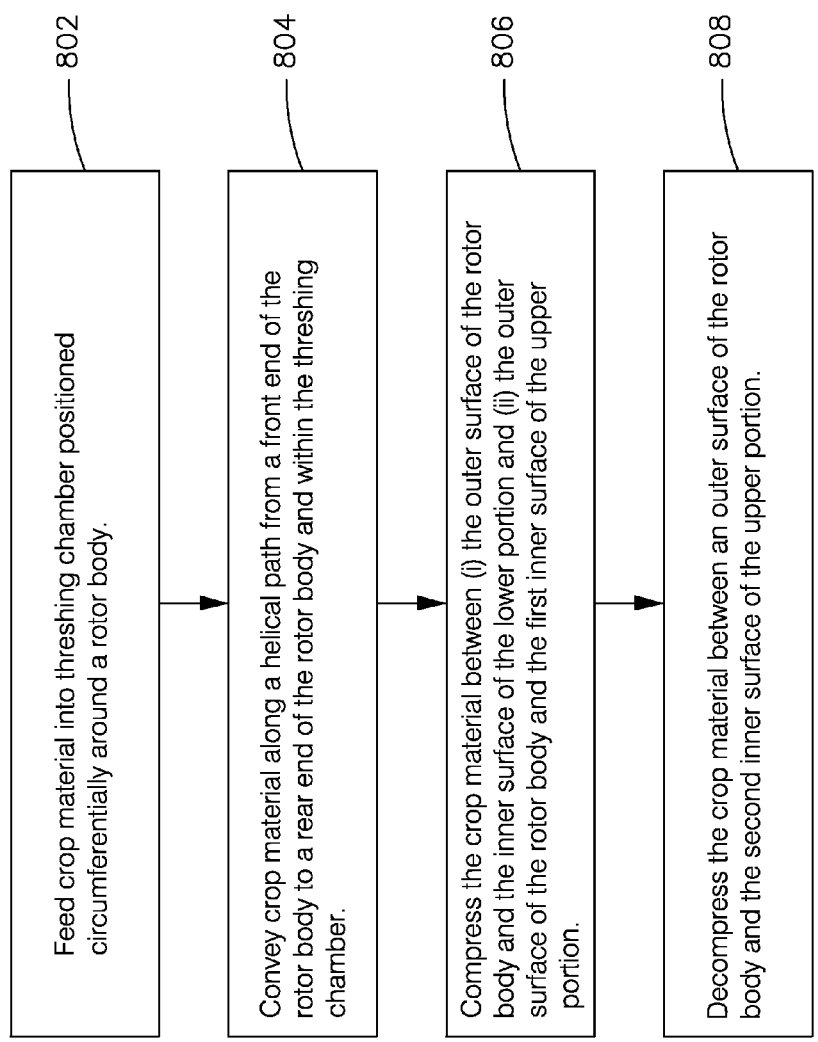
FIG. 8 is a flow chart illustrating an exemplary method for separating grain from material other than grain using a stepped threshing chamber in accordance with an embodiment of the invention.

FIG. 8 is a flow chart illustrating an exemplary method for separating grain from material other than grain using a stepped threshing chamber in accordance with an embodiment of the invention. At block 802, crop material is fed into a substantially cylindrical threshing chamber positioned circumferentially around a rotor body. For example, the crop material may be fed into threshing chamber 502 positioned circumferentially around rotor body 60.

At block 804, crop material may be conveyed along a helical path from a front end of the rotor body to a rear end of the rotor body and within a threshing chamber. A lower portion of the threshing chamber is substantially concentric with the rotor body and has an inner surface positioned a first distance from an outer surface of the rotor body. An upper portion of the threshing chamber includes a first inner surface substantially concentric with the rotor body and positioned the first distance from the outer surface of the rotor body. The upper portion of the threshing chamber also includes a second inner surface substantially concentric with the rotor body. The second inner surface is discontinuous with the first inner surface and positioned a second distance from the outer surface of the rotor body. The second distance is greater than the first distance.

When the crop material is conveyed within the threshing chamber, the crop material may be compressed between (i) the outer surface of the rotor body and the inner surface of the lower portion and (ii) the outer surface of the rotor body and the first inner surface of the upper portion, at block 806. The crop material may then be decompressed between an outer surface of the rotor body and the second inner surface of the upper portion, at block 808. For example, the crop material may be compressed between (i) the outer surface 510 of the rotor body 60 and the inner surface 508 of the lower portion 504 and (ii) the outer surface 510 of the rotor body 60 and the first inner surface 514 of the upper portion 506. The crop material is compressed as it starts to rotate counter-clockwise past the 0 degree mark shown at FIG. 5C because the distance y between the outer surface 510 of rotor body 60 and inner surface 508 is less than the distance x. The crop material remains compressed as it continues to rotate counter-clockwise past the 180 degree mark and between the outer surface 510 of the rotor body 60 and the first inner surface 514 of the upper portion 506.

When the crop material is compressed, the velocity of the crop material being conveyed within the threshing chamber may be increased because the distance y between the outer surface 510 of rotor body 60 and inner surface 508 causes the crop material to move closer to the rotor body 60, which in turn, causes the velocity of the crop material to approach the velocity of the rotor. When the crop material rotates past first inner surface 514 (at the 270 degree mark), the crop material may be decompressed between the outer surface 510 of the rotor body 60 and the second inner surface 512 because the distance x between the outer surface 510 of rotor body 60 and second inner surface 512 is greater than the distance y. By compressing the crop material greater than 180 degrees, and for 270 degrees in the embodiment illustrated at FIG. 5A through FIG. 5C, the velocity of the crop material may be increased, improving the likelihood of grain moving radially outward through the crop mat and perforations of the threshing chamber when the crop material is decompressed.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A combine threshing system comprising:
   (i) a rotor comprising:
      an in-feed area at a front end of the rotor; and
      a rotor body configured to convey material along a helical path from the front end of the rotor body to a rear end of the rotor body, and
   (ii) a substantially cylindrical threshing chamber positioned circumferentially around and spaced apart from the rotor body, the threshing chamber comprising:
      a lower portion substantially concentric with the rotor body and having an inner surface positioned at a first distance from an outer surface of the rotor body; and
      an upper portion comprising:
         a first inner surface substantially concentric with the rotor body and positioned at the first distance from the outer surface of the rotor body; and
         a second inner surface substantially concentric with the rotor body, the second inner surface being discontinuous with the first inner surface and positioned at a second distance from the outer surface of the rotor body, the second distance being greater than the first distance, wherein the first inner surface of the upper portion of the threshing chamber and the inner surface of the lower portion of the threshing chamber occupies about 270 degrees of the circumferential perimeter of the rotor body or less than about 270 degrees of the circumferential perimeter of the rotor body at an edge of rotor body.

2. The combine threshing system of claim 1, wherein,
   the inner surface of the lower portion occupies an area extending longitudinally from a front edge of the lower portion to a rear edge of the lower portion;
   the first inner surface of the upper portion occupies an area extending longitudinally from a front edge of the first inner surface to a rear edge of the first inner surface;
   the second inner surface of the upper portion occupies an area extending longitudinally from a front edge of the second inner surface to a rear edge of the second inner surface.

3. The combine threshing system of claim 2, wherein,
   the area of the first inner surface of the upper portion decreases circumferentially as it extends longitudinally from the front edge of the first inner surface to the rear edge of the first inner surface; and
   the area of the second inner surface of the upper portion increases circumferentially as it extends longitudinally from the front edge of the second inner surface to the rear edge of the second inner surface.

4. The combine threshing system of claim 3, wherein the area of the first inner surface of the upper portion continuously decreases circumferentially as it extends longitudinally from the front edge of the first inner surface to the rear edge of the first inner surface; and
   the area of the second inner surface of the upper portion continuously increases circumferentially as it extends longitudinally from the front edge of the second inner surface to the rear edge of the second inner surface.

5. The combine threshing system of claim 1, wherein the area of the first inner surface of the upper portion discontinuously decreases circumferentially as it extends longitudinally from the front edge of the first inner surface to the rear edge of the first inner surface; and
   the area of the second inner surface of the upper portion discontinuously increases circumferentially as it extends longitudinally from the front edge of the second inner surface to the rear edge of the second inner surface.

6. The combine threshing system of claim 5, wherein the upper portion further comprises a plurality of sections extending longitudinally from the front edges of the first and second inner surfaces to the rear edges of the first and second inner surfaces,
   the area of the first inner surface discontinuously decreases circumferentially in steps along each section; and
   the area of the second inner surface discontinuously increases circumferentially in steps along each section.

7. A combine threshing system comprising:
(i) a rotor comprising:
an in-feed area at a front end of the rotor; and
a rotor body configured to convey material along a helical path from the front end of the rotor body to a rear end of the rotor body, and
(ii) a substantially cylindrical threshing chamber positioned circumferentially around and spaced apart from the rotor body, the threshing chamber comprising:
a lower portion substantially concentric with the rotor body and having an inner surface positioned at a first distance from an outer surface of the rotor body; and
an upper portion comprising:
a first inner surface substantially concentric with the rotor body and positioned at the first distance from the outer surface of the rotor body; and
a second inner surface substantially concentric with the rotor body, the second inner surface being discontinuous with the first inner surface and positioned at a second distance from the outer surface of the rotor body, the second distance being greater than the first distance, wherein
the inner surface of the lower portion occupies an area extending longitudinally from a front edge of the lower portion to a rear edge of the lower portion;
the first inner surface of the upper portion occupies an area extending longitudinally from a front edge of the first inner surface to a rear edge of the first inner surface;
the second inner surface of the upper portion occupies an area extending longitudinally from a front edge of the second inner surface to a rear edge of the second inner surface, and wherein
the areas of the first and second inner surfaces of the upper portion discontinuously increase or decrease circumferentially as they extend longitudinally from the front edge of the threshing chamber to the rear edge of the threshing chamber.

8. The combine threshing system of claim 7, wherein,
the inner surface of the lower portion and the first inner surface of the upper portion together occupy a circumferential perimeter of about 270 degrees; and
the second inner surface of the upper portion occupies a circumferential perimeter of about 90 degrees.

9. The combine threshing system of claim 7, wherein
the inner surface of the lower portion and the first inner surface of the upper portion together occupy a first front circumferential perimeter greater than 270 degrees at the front edges of the inner surface of the lower portion and the first inner surface of the upper portion;
the inner surface of the lower portion and the first inner surface of the upper portion together occupy a first rear circumferential perimeter less than 270 degrees at the rear edges of the inner surface of the lower portion and the first inner surface of the upper portion;
the second inner surface of the upper portion occupies a second front circumferential perimeter less than 90 degrees at the front edge of the second inner surface of the upper portion; and
the second inner surface of the upper portion occupies a second rear circumferential perimeter greater than 90 degrees at the rear edge of the second inner surface of the upper portion.

10. A combine threshing system comprising:
a lower portion of a substantially cylindrical threshing chamber having an inner surface positioned a first distance from a center of the threshing chamber; and
an upper portion of the substantially cylindrical threshing chamber, the upper portion comprising a plurality of inner surfaces positioned at varying radial distances from a rotor body such that the varying radial distances continuously increase or decrease over about ninety degrees of the entire inner surface area of the upper portion, wherein the plurality of inner surfaces comprises:
at least a first inner surface positioned circumferentially at a first distance from the center of the threshing chamber, and
at least a second inner surface discontinuous with the first inner surface and positioned circumferentially at a second distance from the center of the threshing chamber, the second distance being less than the first distance.

11. The combine threshing system of claim 10, wherein,
the inner surface of the lower portion and the first inner surface of the upper portion together occupy a circumferential perimeter greater than 180 degrees; and
the second inner surface of the upper portion occupies a circumferential perimeter less than 180 degrees.

12. The combine threshing system of claim 10, wherein,
the inner surface of the lower portion occupies an area extending longitudinally from a front edge of the lower portion to a rear edge of the lower portion;
the first inner surface of the upper portion occupies an area extending longitudinally from a front edge of the first inner surface to a rear edge of the first inner surface;
the second inner surface of the upper portion occupies an area extending longitudinally from a front edge of the second inner surface to a rear edge of the second inner surface.

13. The combine threshing system of claim 12, wherein,
the area of the first inner surface of the upper portion decreases circumferentially as it extends longitudinally from the front edge of the first inner surface to the rear edge of the first inner surface; and
the area of the second inner surface of the upper portion increases circumferentially as it extends longitudinally from the front edge of the second inner surface to the rear edge of the second inner surface.

14. The combine threshing system of claim 13, wherein,
the inner surface of the lower portion and the first inner surface of the upper portion together occupy a first front circumferential perimeter greater than 270 degrees at the front edges of the inner surface of the lower portion and the first inner surface of the upper portion;
the inner surface of the lower portion and the first inner surface of the upper portion together occupy a first rear circumferential perimeter less than 270 degrees at the rear edges of the inner surface of the lower portion and the first inner surface of the upper portion;
the second inner surface of the upper portion occupies a second front circumferential perimeter less than 90 degrees at the front edge of the second inner surface of the upper portion; and
the second inner surface of the upper portion occupies a second rear circumferential perimeter greater than 90 degrees at the rear edge of the second inner surface of the upper portion.

15. The combine threshing system of claim 13, wherein,
the area of the first inner surface of the upper portion continuously decreases circumferentially as it extends longitudinally from the front edge of the first inner surface to the rear edge of the first inner surface; and
the area of the second inner surface of the upper portion continuously increases circumferentially as it extends longitudinally from the front edge of the second inner surface to the rear edge of the second inner surface.

16. The combine threshing system of claim 13, wherein, the area of the first inner surface of the upper portion discontinuously decreases circumferentially as it extends longitudinally from the front edge of the first inner surface to the rear edge of the first inner surface; and the area of the second inner surface of the upper portion discontinuously increases circumferentially as it extends longitudinally from the front edge of the second inner surface to the rear edge of the second inner surface.

17. The combine threshing system of claim 13, wherein, the upper portion further comprises a plurality of sections extending longitudinally from the front edges of the first and second inner surfaces to the rear edges of the first and second inner surfaces, the area of the first inner surface discontinuously decreases circumferentially in steps along each section; and the area of the second inner surface discontinuously increases circumferentially in steps along each section.

18. A method for separating grain from material other than grain comprising:

feeding crop material into a substantially cylindrical threshing chamber positioned circumferentially around a rotor body;

conveying crop material along a helical path from a front end of the rotor body to a rear end of the rotor body and within a threshing chamber comprising:

a lower portion substantially concentric with the rotor body and having an inner surface positioned a first distance from an outer surface of the rotor body, and an upper portion comprising:

a first inner surface substantially concentric with the rotor body and positioned the first distance from the outer surface of the rotor body, and a second inner surface substantially concentric with the rotor body, the second inner surface being discontinuous with the first inner surface and positioned a second distance from the outer surface of the rotor body, the second distance being greater than the first distance;

compressing the crop material between (i) the outer surface of the rotor body and the inner surface of the lower portion and (ii) the outer surface of the rotor body and the first inner surface of the upper portion; and decompressing the crop material between an outer surface of the rotor body and the second inner surface of the upper portion.

19. The method of claim 18, wherein compressing the crop material comprises increasing the velocity of the crop material being conveyed within the threshing chamber.

20. The method of claim 18, wherein compressing the crop material comprises compressing the crop material a plurality of times between (i) the outer surface of the rotor body and an area of the inner surface of the lower portion extending longitudinally from a front edge of the lower portion to a rear edge of the lower portion, and (ii) the outer surface of the rotor body and an area of the first inner surface of the upper portion extending longitudinally from a front edge of the first inner surface to a rear edge of the first inner surface; and decompressing the crop material comprises decompressing the crop material a plurality of times between the outer surface of the rotor body and an area of the second inner surface of the upper portion extending longitudinally from a front edge of the second inner surface to a rear edge of the second inner surface.

\* \* \* \* \*